(12) United States Patent
Wei (10) Patent No.: US 9,880,008 B2
(45) Date of Patent: Jan. 30, 2018

(54) INDOOR POSITIONING METHOD AND INDOOR POSITIONING SYSTEM

(71) Applicant: HON HAI PRECISION INDUSTRY CO., LTD., New Taipei (TW)

(72) Inventor: Chung-Che Wei, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 15/083,301

(22) Filed: Mar. 29, 2016

(65) Prior Publication Data

US 2017/0205238 A1    Jul. 20, 2017

(30) Foreign Application Priority Data

Jan. 16, 2016 (TW) .............................. 105101311 A (51) Int. Cl.
*G01C 21/10* (2006.01)
*G01C 21/20* (2006.01)

(52) U.S. Cl.
CPC .................... *G01C 21/206* (2013.01)

(58) Field of Classification Search
USPC ......................................................... 701/500
See application file for complete search history.

(56) References Cited

U.S. PATENT DOCUMENTS

| | | | | |
|---|---|---|---|---|
| 8,639,640 B1* | 1/2014 | Kadous | ................. | G01S 5/0252 342/451 |
| 2009/0043504 A1* | 2/2009 | Bandyopadhyay | .... | G01C 17/38 701/469 |
| 2012/0290254 A1* | 11/2012 | Thrun | ..................... | G01C 21/16 702/150 |
| 2013/0039391 A1* | 2/2013 | Skarp | .................... | H04W 4/023 375/148 |
| 2013/0336138 A1* | 12/2013 | Venkatraman | .......... | H04W 4/02 370/252 |
| 2014/0152809 A1* | 6/2014 | Jarvis | ....................... | H04N 7/18 348/135 |
| 2015/0018018 A1* | 1/2015 | Shen | ....................... | H04W 4/04 455/457 |
| 2015/0168153 A1* | 6/2015 | Hsu | ........................ | G01C 21/20 701/469 |
| 2015/0281910 A1* | 10/2015 | Choudhury | ............. | G01S 5/021 455/456.1 |
| 2016/0148417 A1* | 5/2016 | Kim | ....................... | G06T 19/006 345/419 |
| 2016/0259061 A1* | 9/2016 | Carter | ..................... | G01S 19/05 |
| 2016/0298969 A1* | 10/2016 | Glenn, III | ............. | G01S 5/0263 |

* cited by examiner

*Primary Examiner* — Tyler Paige
(74) *Attorney, Agent, or Firm* — ScienBiziP, P.C.

(57) ABSTRACT

The disclosure relates to an indoor positioning method performed by an indoor positioning system installed on an object inside of a building. The indoor positioning system includes a gyroscope, a digital compass, an accelerometer, a distance sensor and a processor; an indoor map of the building is stored in the processor. Dead reckoning is performed to obtain an estimated position of the object on the map. An target area around the estimated position is selected on the map. Several measurements between the object and walls of the building are performed to obtain an actual distance data. The unique point inside the target area which matches the actual distance data is used the actual position of the object.

19 Claims, 8 Drawing Sheets

FIG. 8

INDOOR POSITIONING METHOD AND INDOOR POSITIONING SYSTEM

CROSS-REFERENCE TO RELATED APPLICATIONS

This application claims priority to Chinese Patent Application No. 105101311 filed on Jan. 16, 2016 in the Taiwan Intellectual Property Office, the contents of which are incorporated by reference herein.

FIELD

The subject matter herein generally relates to indoor positioning methods based on dead reckoning and indoor positioning systems (IPS).

BACKGROUND

There are currently several existing indoor positioning systems, such as distance measurements to nearby anchor nodes (Wi-Fi, Bluetooth, etc.), image positioning or dead reckoning. However, each of the aforementioned techniques has their own flaws.

However, the distance measurements approach will require extra apparatus setup (e.g. Wi-Fi emitter/receiver) around the building, resulting in cumbersome work as well as added cost. Dead reckoning can avoid the additional setup and expenditure, but there are no means to correct the accumulated error over time. Although image positioning does not require additional equipment and do not have cumulative errors, they are expensive and involves a significant amount of processing.

What is needed, therefore, is to provide an indoor positioning method and an indoor positioning system which can overcome the shortcomings as described above.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

The connection can be such that the objects are permanently connected or releasably connected. The term "inside" indicates that at least a portion of a region is partially contained within a boundary formed by the object. The term "substantially" is defined to be essentially conforming to the particular dimension, shape or other word that substantially modifies, such that the component need not be exact. The term "comprising" means "including, but not necessarily limited to"; it specifically indicates open-ended inclusion or membership in a so-described combination, group, series and the like. It should be noted that references to "an" or "one" embodiment in this disclosure are not necessarily to the same embodiment, and such references mean at least one.

The present disclosure relates to indoor positioning methods and indoor positioning systems described in detail as below.

Figure 1:
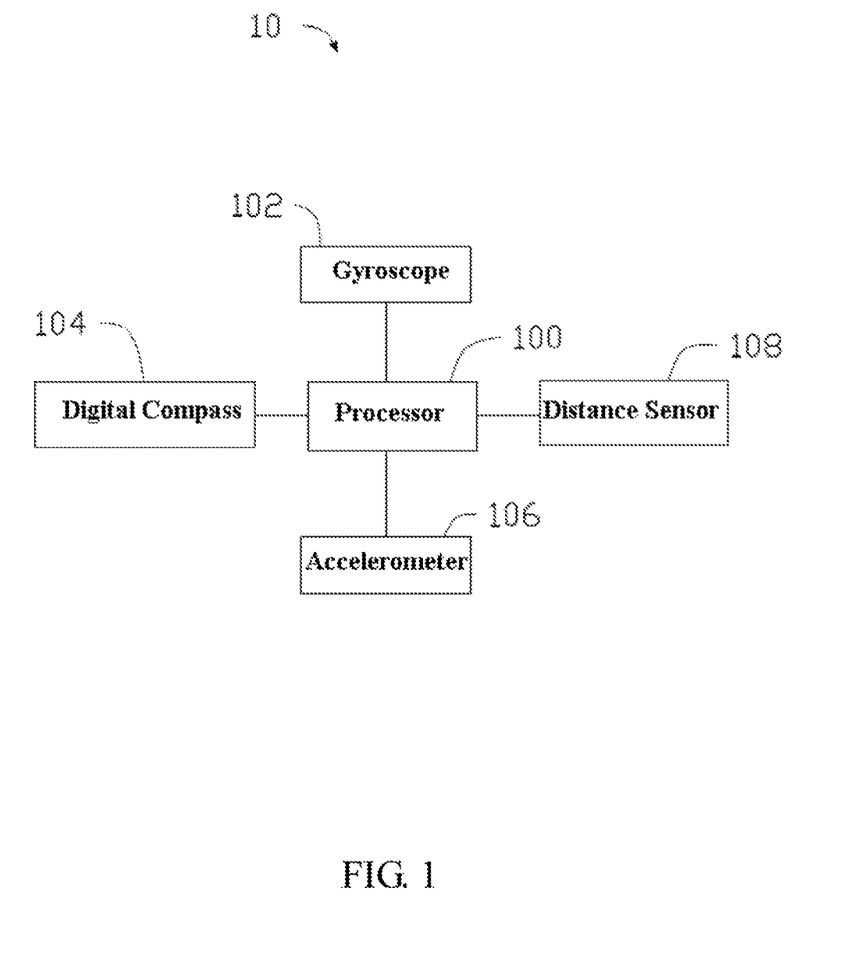
FIG. 1 is a functional diagram of an indoor positioning system.

FIG. 1 illustrates an indoor positioning system 10 of this disclosure. The indoor positioning system 10 includes a gyroscope 102, a digital compass 104, an accelerometer 106, a distance sensor 108 and a processor 100. The gyroscope 102, the digital compass 104, the accelerometer 106 and the distance sensor 108 are electrically connected to the processor 100. The indoor positioning system 10 can consist of the gyroscope 102, the digital compass 104, the accelerometer 106, the distance sensor 108 and the processor 100.

Referring to FIG. 2-8, the indoor positioning system 10 is configured to be installed on the object 12 which can be static or moving inside of the building 107. An indoor map 101 of the building 107 is stored in the processor 100. The gyroscope 102, the digital compass 104 and the accelerometer 106 are configured to obtain an estimated position 120 of the object 12 on the indoor map 101. The distance sensor 108 is configured to detect the actual distance data D between the object 12 and the wall 105 of the building 107 around the object 12. The distance sensor 108 can be a single rotatable range finder or a plurality of non-rotatable range finders. The distance sensor 108 can be a sonar sensor, an inductive sensor, a magnetic sensor, a capacitance sensor or a laser sensor. The processor 100 includes a correction module configured to correct the estimated position 120 according to the actual distance data D.

Compared with a conventional indoor positioning system based on dead reckoning, the indoor positioning system 10 includes the distance sensor 108 and the correction module of the processor 100. Compared with conventional indoor positioning system based on distance measurement, the indoor positioning system 10 omits the extra apparatus, such as Wi-Fi, bluetooth, emitter, and receiver. Compared with conventional indoor positioning system based on image, the indoor positioning system 10 does not need image acquisition device and image processing device.

Figure 2:
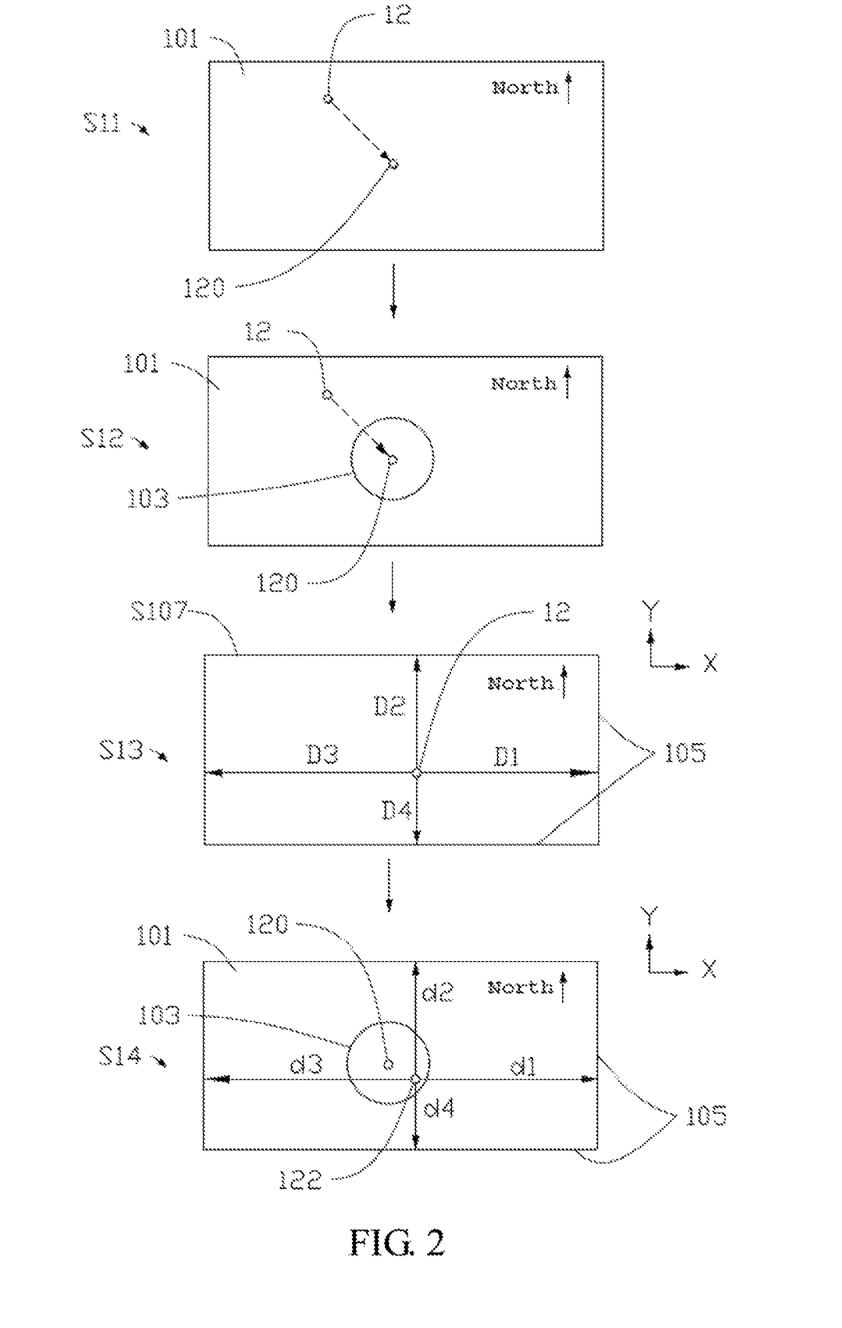
FIG. 2 is a flow chart of an indoor positioning method of example 1.

Referring to FIG. 2, an indoor positioning method performed by the indoor positioning system 10 is illustrated. The method includes following steps:

step (S11), obtaining the estimated position 120 of the object 12 on the indoor map 101;

step (S12), selecting a target area 103 on the indoor map 101, wherein the estimated position 120 is inside the target area 103;

step (S13), detecting the actual distance data D between the object 12 and the wall 105 surrounding the object 12, wherein the actual distance data D includes a 1st actual distance D1 along an 1st direction, a 2nd actual distance D2 along a 2nd direction, . . . and an Mth actual distance DM along an Mth direction, M≥2;

step (S14), judging whether an unique point inside the target area 103 matches the actual distance data D; if yes, the unique point is used as the actual position 122 of the object 12, if no, go to step (S15); and step (S15), increasing value of M, and go back to step (S13).

In step (S11), the estimated position 120 of the object 12 is obtained by the gyroscope 102, the digital compass 104 and the accelerometer 106 through dead reckoning and then sent to the processor 100.

In step (S12), the selecting the target area 103 is performed by the processor 100. The target area 103 is inside the indoor map 101. The shape of the target area 103 is not limited and can be circular, triangle, rectangle, square or polygon. The estimated position 120 can be the geometrical center of the target area 103.

Figure 3:
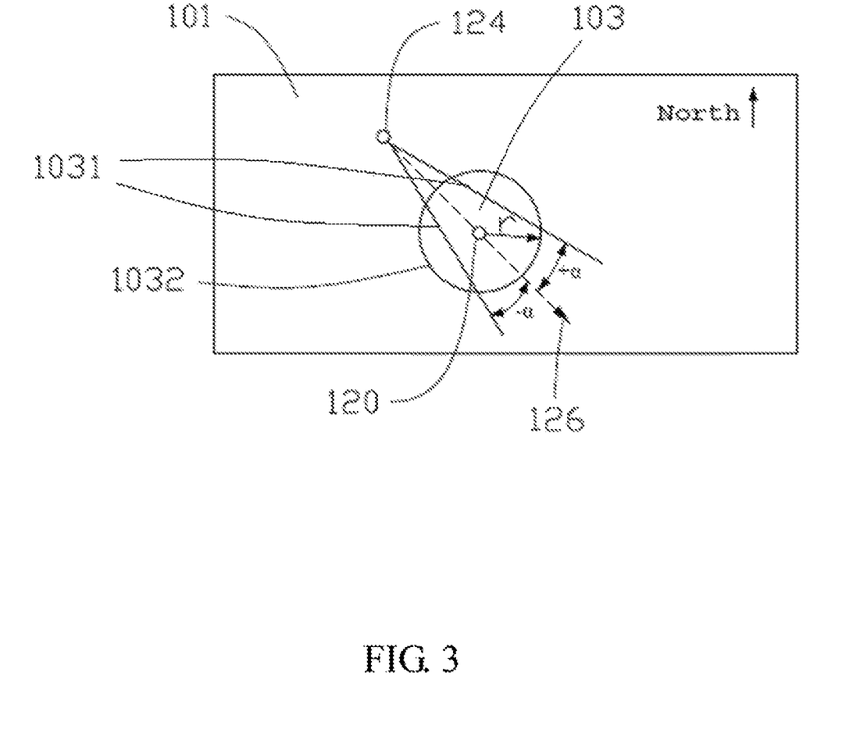
FIG. 3 is a schematic view of a process of selecting a target area in the indoor positioning method of example 1.

The selecting the target area 103 is very important to the workload of determining the actual position 122 of the object 12. In the process of determining the actual position 122 of the object 12 according to the actual distance data D, only the points inside the target area 103 rather than on entire indoor map 101 would be calculated. The target area 103 can be selected according to accuracy and a cumulative error of the gyroscope 102, the digital compass 104 and the accelerometer 106. Referring to FIG. 3, in one example, the speed error is v, direction deviation is α, and the object 12 moves from a starting position 124 to the estimated position 120 within a time t. Two half-lines 1031 with the starting position 124 as an end point are defined. The angle between each half-lines 1031 and the moving direction 126 is α. A circular 1032 having the estimated position 120 as the geometrical center is defined. The semi-diameter r of the circular satisfies formula: r=vt. The common area of the two half-lines 1031 and the circular 1032 is defined as the target area 103.

In step (S13), the actual distance data D is detected by the distance sensor 108 and then sent to the processor 100. When M=2, the 1st direction and the 2nd direction are substantially perpendicular with each other, and at least one of the 1st direction and the 2nd direction is substantially perpendicular with the wall 105 of the building 107. When M=4, in a rectangular coordinates system, the 1st direction is +X direction, the 2nd direction is +Y direction, the 3rd direction is −X direction, and the 4th direction is −Y direction. The actual distance data D includes the 1st actual distance D1 along the +X direction, the 2nd actual distance D2 along the +Y direction, the 3rd actual distance D3 along the −X direction, and the 4th actual distance D4 along the −Y direction. When 8≥M>4, the 5th direction, the 6th direction, the 7th direction and the 8th direction can be the direction between adjacent two of the +X direction, the +Y direction, the −X direction and the −Y direction.

In step (S14), the judging can be performed by different judging methods described as in following examples.

In step (S15), the increasing value of M can be performed by different increasing methods, such as M=M+A, and A is a natural number; or M=B×M, and B is a natural number greater than one.

The different examples of indoor positioning methods based on different judging methods are described in detail as below.

Example 1

Referring to FIG. 2, an indoor positioning method of example 1 performed by the indoor positioning system 10 is illustrated. The method includes following steps:

step (S11), obtaining the estimated position 120 of the object 12 on the indoor map 101;

step (S12), selecting a target area 103 on the indoor map 101, wherein the estimated position 120 is inside the target area 103;

step (S13), detecting the actual distance data D between the object 12 and the wall 105 surrounding the object 12, wherein the actual distance data D includes the 1st actual distance D1 along the 1st direction, the 2nd actual distance D2 along the 2nd direction . . . and the Mth actual distance DM along the Mth direction, M=4, an angle between adjacent two of the 1st direction, the 2nd direction . . . and the Mth direction is α, and α=360°/M;

step (S14), judging whether an unique point inside the target area 103 matches the actual distance data D by following substeps:

step (S141), calculating a map distance data d between a plurality points inside the target area 103 and the wall 105 of the indoor map 101, wherein an interval between adjacent two of the plurality points is H, and the map distance data d includes a 1st map distance d1 along the 1st direction, a 2nd map distance d2 along the 2nd direction . . . and a Nth map distance dN along the Nth direction, M≥N≥2;

step (S142), judging whether the unique point inside the target area 103 has the map distance data d which matches the actual distance data D by comparing the map distance data d with corresponding one of the actual distance data D; if yes, the unique point is used as the actual position 122 of the object 12, if no, go to step (S143);

step (S143), increasing value of N by N=N+1, calculating the Nth map distance dN along the Nth direction, and judging whether the unique point inside the target area 103 has the map distance data d which matches the actual distance data D; if yes, the unique point is used as the actual position 122 of the object 12, if no, go to step (S144); and     step (S144), judging N<M or N=M, if N<M, go back to step (S143), if N=M, go to step (S15); and step (S15), increasing value of M, and go back to step (S13).

In step (S12), the target area 103 is circular having the estimated position 120 as the geometrical center.

In step (S13), when M=4, the 1st direction is east, the 2nd direction is north, the 3rd direction is west, and the 4th direction is south. When 8≥M>4, the 5th direction is northeast, the 6th direction is northwest, the 7th direction is southwest, and the 8th direction is southeast.

In step (S141), as shown in FIG. 2, when N=4, in the rectangular coordinates system, the map distance data d includes the 1st map distance d1 along the +X direction, a 2nd map distance d2 along the +Y direction, the 3rd map distance d3 along the −X direction, and the 4th map distance d4 along the −Y direction. The greater the N is, the more times needed to calculate the map distance data d in step (S141). Thus, more times are needed to compare the map distance data d with corresponding one of the actual distance data D in step (S142), and the actual position 122 obtained by the method is more accurate.

Furthermore, the more points inside the target area 103 are selected in step (S141), the actual position 122 obtained by the method is more accurate. However, more workload is needed. In example 1, the interval H between adjacent two of the plurality points is the same as the accuracy S of the distance sensor 108. The term "matches" includes the map distance data d are identical to the actual distance data D, or distance difference between the map distance data d and the actual distance data D is less than the accuracy S of the distance sensor 108. The judging whether the unique point inside the target area 103 has the map distance data d which matches the actual distance data D comprises judging whether the unique point inside the target area 103 satisfies a condition: $|D-d| \leq S$.

Example 2

Figure 4:
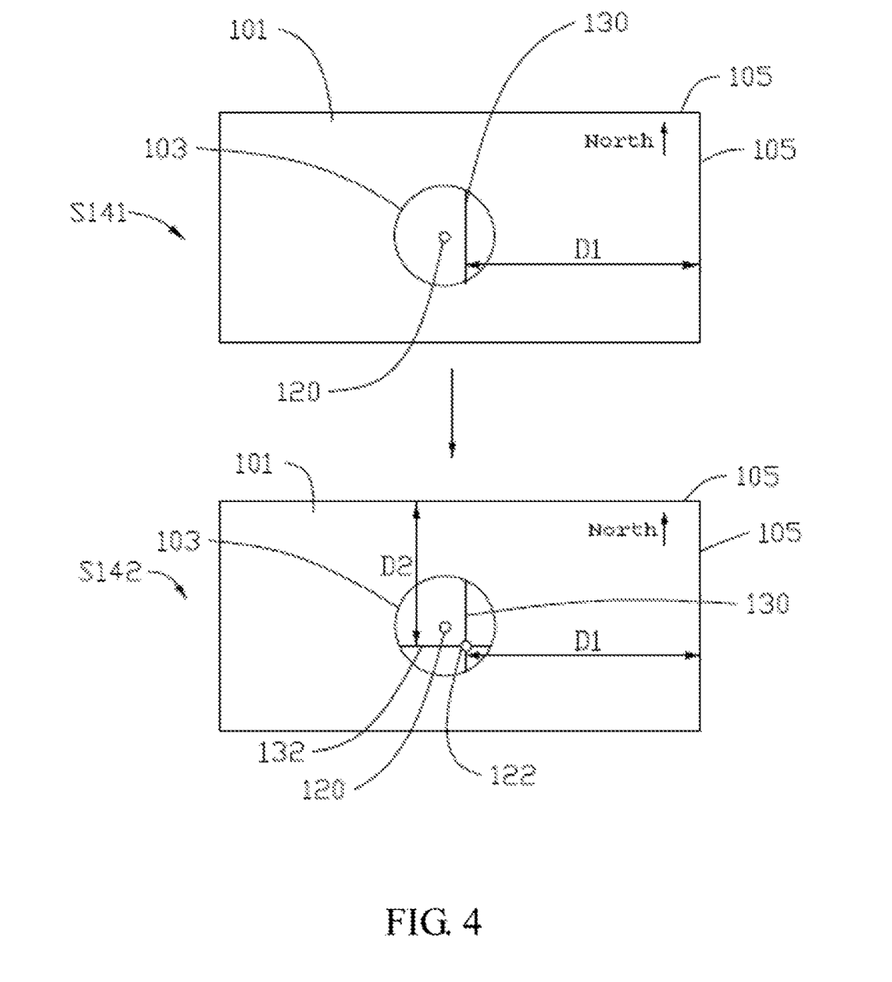
FIG. 4 is a schematic view of a process of determining an actual position of an object in a target area of an indoor positioning method of example 2.

Referring to FIG. 4, an indoor positioning method of example 2 performed by the indoor positioning system 10 is illustrated. The method includes following steps:

step (S11), obtaining the estimated position 120 of the object 12 on the indoor map 101;

step (S12), selecting a target area 103 on the indoor map 101, wherein the estimated position 120 is inside the target area 103;

step (S13), detecting the actual distance data D between the object 12 and the wall 105 surrounding the object 12, wherein the actual distance data D includes the 1st actual distance D1 along the 1st direction, the 2nd actual distance D2 along the 2nd direction . . . and the Mth actual distance DM along the Mth direction, M=4, an angle between adjacent two of the 1st direction, the 2nd direction . . . and the Mth direction is α, and α=360°/M;

step (S14), judging whether an unique point inside the target area 103 matches the actual distance data D by following substeps:

step (S141), calculating the 1st map distance d1 along the 1st direction between each point inside the target area 103 and the wall 105 of the indoor map 101, and obtaining a 1st line 130 by connecting all the points that satisfies the condition d1=D1;

step (S142), calculating the 2nd map distance d2 along the 2nd direction between each point inside the target area 103 and the wall 105 of the indoor map 101, and obtaining a 2nd line 132 by connecting all points that satisfies the condition d2=D2;

step (S143), judging whether the 1st line 130 and the 2nd line 132 have an unique common point; if yes, the unique common point is used as the actual position 122 of the object 12, if no, set N=2 and go to step (S144);

step (S144), increasing value of N by N=N+1, calculating the Nth map distance dN along the Nth direction between each point inside the target area 103 and the wall 105 of the indoor map 101, and obtaining a Nth line by connecting all the points that satisfies the condition dN=DN; judging whether all the 1st line 130, the 2nd line 132 . . . and the Nth line have the unique common point; if yes, the unique point is used as the actual position 122 of the object 12, if no, go to step (S145); and step (S145), judging N<M or N=M, if N<M, go back to step (S144), if N=M, go to step (S15); and step (S15), increasing value of M, and go back to step (S13).

Figure 5:
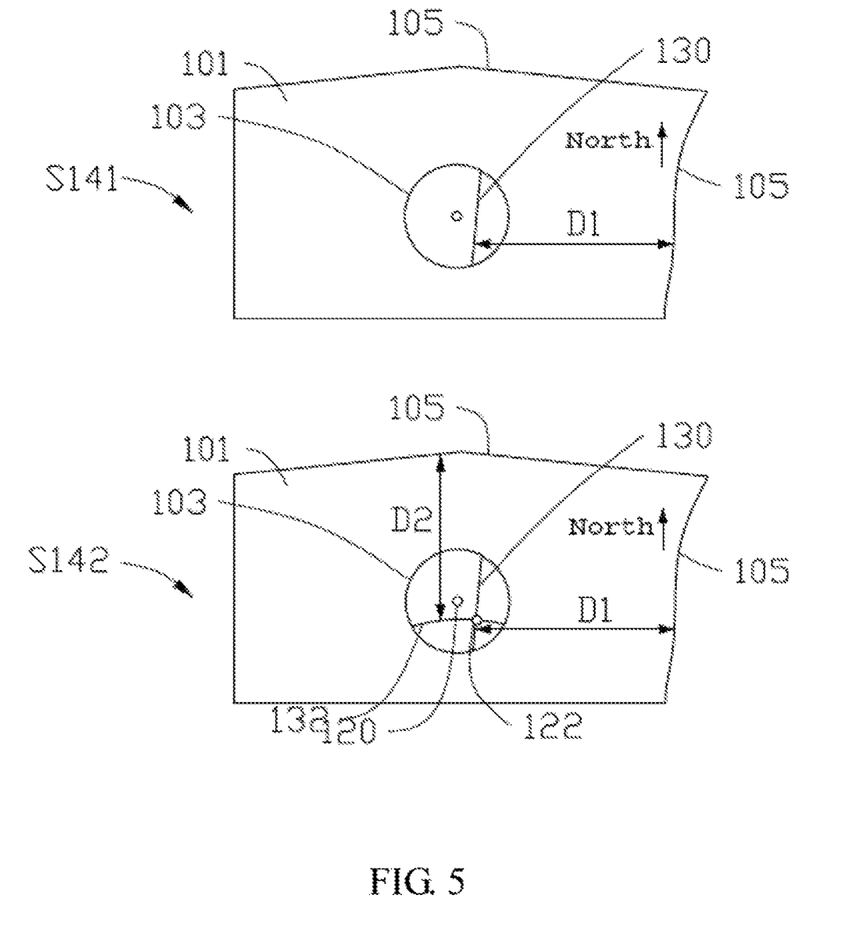
FIG. 5 is a schematic view of a process of determining an actual position of an object in a target area of an indoor positioning method of example 3.
Figure 6:
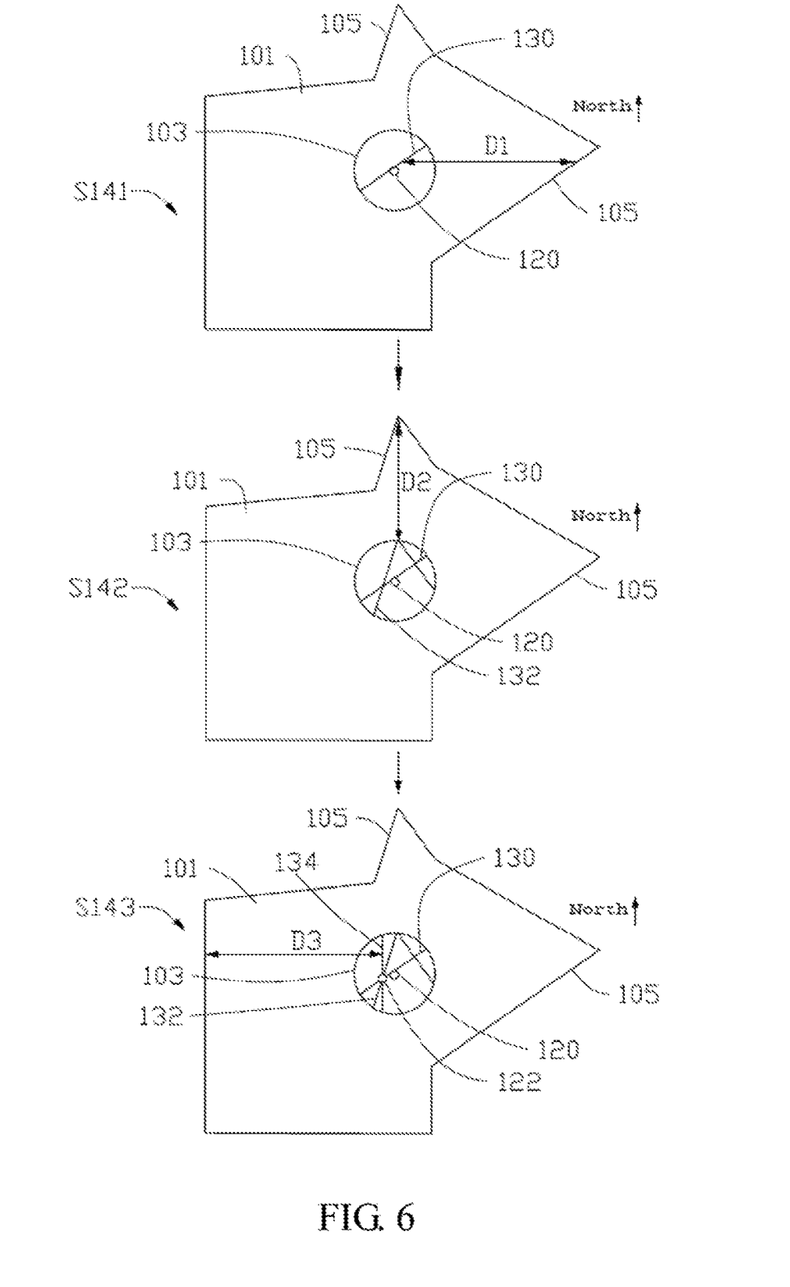
FIG. 6 is a schematic view of a process of determining an actual position of an object in a target area of an indoor positioning method of example 4.

The method of example 2 is similar to the method of example 1, except that in step (S14), the judging whether the unique point inside the target area 103 matches the actual distance data D is performed by judging whether the 1st line 130, the 2nd line 132 . . . and the Nth line have the unique common point. The 1st direction is east and the 2nd direction is north. The wall 105 of the indoor map 101 can be a straight line as shown in FIG. 4, or a curved line as shown in FIGS. 5-6 below. The 1st line 130, the 2nd line 132 . . . and the Nth lines can be a straight line as shown in FIG. 4, an arc line as shown in FIG. 5, a fold line as shown in FIG. 6. Sometimes, only two lines, such as the 1st line 130 and the 2nd line 132 in FIGS. 4-5, can have the unique common point. However, more than two lines, such as the 1st line 130, the 2nd line 132 and the 3rd line 134 in FIG. 6, can have the unique common point.

Example 3

Referring to FIG. 5, an indoor positioning method of example 3 performed by the indoor positioning system 10 is illustrated. The method includes following steps:

step (S11), obtaining the estimated position 120 of the object 12 on the indoor map 101;

step (S12), selecting a target area 103 on the indoor map 101, wherein the estimated position 120 is inside the target area 103;

step (S13), detecting the actual distance data D between the object 12 and the wall 105 surrounding the object 12, wherein the actual distance data D includes the 1st actual distance D1 along the 1st direction, the 2nd actual distance D2 along the 2nd direction . . . and the Mth actual distance DM along the Mth direction, M=4, an angle between adjacent two of the 1st direction, the 2nd direction . . . and the Mth direction is α, and α=360°/M;

step (S14), judging whether an unique point inside the target area 103 matches the actual distance data D by following substeps:

step (S141), the wall 105 of the indoor map 101 that is at the 1st direction of the target area 103 is parallel moved a distance D1 along the inverse direction of the 1st direction to obtain a 1st moved line, and part of the 1st moved line that is inside the target area 103 is defined as a 1st line 130;

step (S142), the wall 105 of the indoor map 101 that is at the 2nd direction of the target area 103 is parallel moved a distance D2 along the inverse direction of the 2nd direction to obtain a 2nd moved line, and part of the 2nd moved line that is inside the target area 103 is defined as a 2nd line 132;

step (S143), judging whether the 1st line 130 and the 2nd line 132 have an unique common point; if yes, the unique common point is used as the actual position 122 of the object 12, if no, set N=2 and go to step (S144);

step (S144), increasing value of N by N=N+1, the wall 105 of the indoor map 101 that is at the Nth direction of the target area 103 is parallel moved a distance DN along the inverse direction of the Nth direction to obtain a Nth moved line, and part of the Nth moved line that is inside the target area 103 is defined as a Nth line; judging whether the 1st line 130, the 2nd line 132 . . . and the Nth line have the unique common point; if yes, the unique point is used as the actual position 122 of the object 12, if no, go to step (S145); and step (S145), judging N<M or N=M, if N<M, go back to step (S144), if N=M, go to step (S15); and step (S15), increasing value of M, and go back to step (S13).

The method of example 3 is similar to the method of example 2, except that in step (514C), the 1st line 130, the 2nd line 132 . . . and the Nth line are obtained by moving the wall 105 of the indoor map 101. The 1st direction is east and the 2nd direction is north.

Example 4

Referring to FIG. 6, an indoor positioning method of example 4 performed by the indoor positioning system 10 is illustrated. The method includes following steps:

step (S11), obtaining the estimated position 120 of the object 12 on the indoor map 101;

step (S12), selecting a target area 103 on the indoor map 101, wherein the estimated position 120 is inside the target area 103;

step (S13), detecting the actual distance data D between the object 12 and the wall 105 surrounding the object 12, wherein the actual distance data D includes the 1st actual distance D1 along the 1st direction, the 2nd actual distance D2 along the 2nd direction . . . and the Mth actual distance DM along the Mth direction, M=4, an angle between adjacent two of the 1st direction, the 2nd direction . . . and the Mth direction is α, and α=360°/M;

step (S14), judging whether an unique point inside the target area 103 matches the actual distance data D by following substeps:

step (S141), calculating the 1st map distance d1 along the 1st direction between each point inside the target area 103 and the wall 105 of the indoor map 101, and obtaining a 1st line 130 by connecting all the points that satisfies the condition d1=D1;

step (S142), calculating the 2nd map distance d2 along the 2nd direction between each point inside the target area 103 and the wall 105 of the indoor map 101, and obtaining a 2nd line 132 by connecting all points that satisfies the condition d2=D2;

step (S143), calculating the 3rd map distance d3 along the 3rd direction between each point inside the target area 103 and the wall 105 of the indoor map 101, and obtaining a 3rd line 134 by connecting all points that satisfies the condition d3=D3;

step (S144), judging whether all the 1st line 130, the 2nd line 132 and the 3rd line 134 have an unique common point; if yes, the unique common point is used as the actual position 122 of the object 12, if no, set N=3 and go to step (S145);

step (S145), increasing value of N by N=N+1, calculating the Nth map distance dN along the Nth direction between each point inside the target area 103 and the wall 105 of the indoor map 101, and obtaining a Nth line by connecting all the points that satisfies the condition dN=DN; judging whether all the 1st line 130, the 2nd line 132, the 3rd line 134 . . . and the Nth line have the unique common point; if yes, the unique point is used as the actual position 122 of the object 12, if no, go to step (S146); and step (S146), judging N<M or N=M, if N<M, go back to step (S145), if N=M, go to step (S15); and step (S15), increasing value of M, and go back to step (S13).

The method of example 4 is similar to the method of example 2, except that in the first judging step (S144) of judging whether have the unique common point, three lines, the 1st line 130, the 2nd line 132 and the 3rd line 134, rather than two lines are used. The 1st direction is east, the 2nd direction is north and the 3rd direction is west.

Example 5

Figure 7:
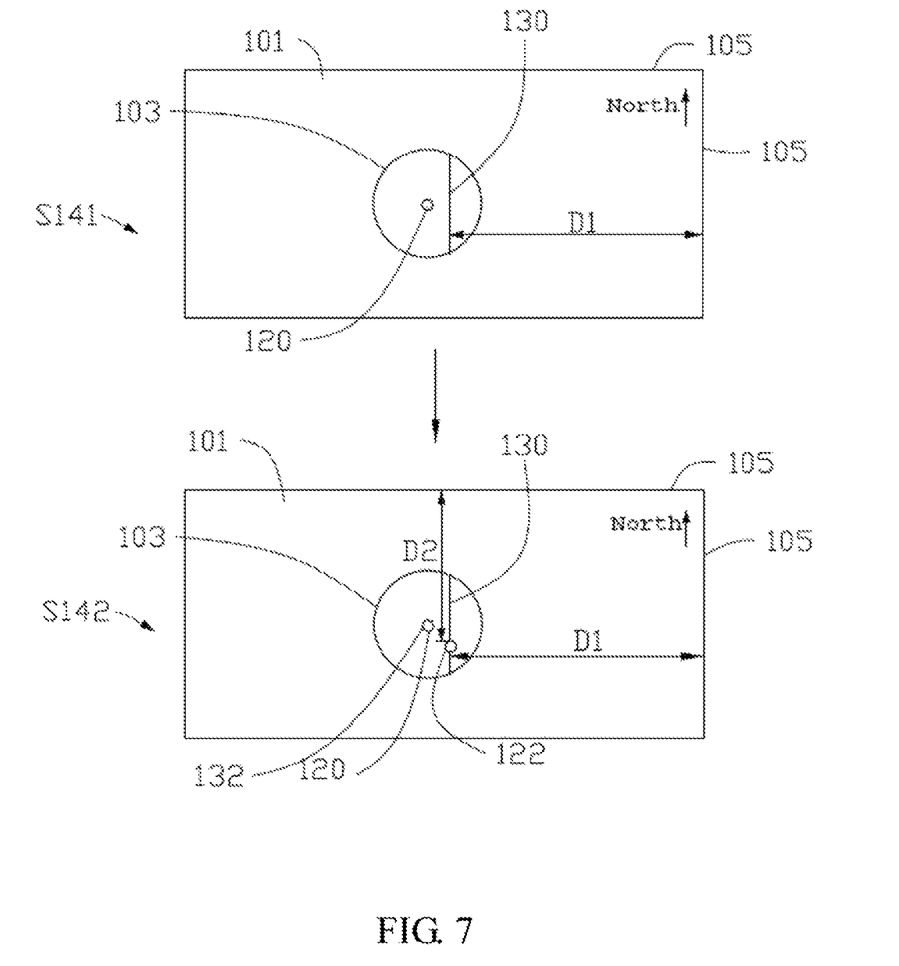
FIG. 7 is a schematic view of a process of determining an actual position of an object in a target area of an indoor positioning method of example 5.

Referring to FIG. 7, an indoor positioning method of example 5 performed by the indoor positioning system 10 is illustrated. The method includes following steps:

step (S11), obtaining the estimated position 120 of the object 12 on the indoor map 101;

step (S12), selecting a target area 103 on the indoor map 101, wherein the estimated position 120 is inside the target area 103;

step (S13), detecting the actual distance data D between the object 12 and the wall 105 surrounding the object 12, wherein the actual distance data D includes the 1st actual distance D1 along the 1st direction, the 2nd actual distance D2 along the 2nd direction . . . and the Mth actual distance DM along the Mth direction, M=4, an angle between adjacent two of the 1st direction, the 2nd direction . . . and the Mth direction is α, and α=360°/M;

step (S14), judging whether an unique point inside the target area 103 matches the actual distance data D by following substeps:

step (S141), calculating the 1st map distance d1 along the 1st direction between each point inside the target area 103 and the wall 105 of the indoor map 101, and obtaining a 1st line 130 by connecting all points that satisfies the condition d1=D1;

step (S142), calculating the 2nd map distance d2 along the 2nd direction between each point on the 1st line 130 and the wall 105 of the indoor map 101;

step (S143), judging whether an unique point on the 1st line 130 satisfies d2=D2; if yes, the unique point on the 1st line 130 is used as the actual position 122 of the object 12, if no, set N=2 and go to step (S144)

step (S144), increasing value of N by N=N+1, calculating the Nth map distance dN along the Nth direction between each point that satisfies d(N−1)=D(N−1) and the wall 105 of the indoor map 101; judging whether the unique point satisfies dN=DN; if yes, the unique point is used as the actual position 122 of the object 12, if no, go to step (S145); and step (S145), judging N<M or N=M, if N<M, go back to step (S144), if N=M, go to step (S15); and step (S15), increasing value of M, and go back to step (S13).

The method of example 5 is similar to the method of example 1, except that in step (S14), the 1st line 130 inside the target area 103 is defined first, and the all the points on the 1st line 130 rather than inside the target area 103 are selected to calculate the map distance data d. The 1st direction is east, and the 2nd direction is north.

Example 6

Figure 8:
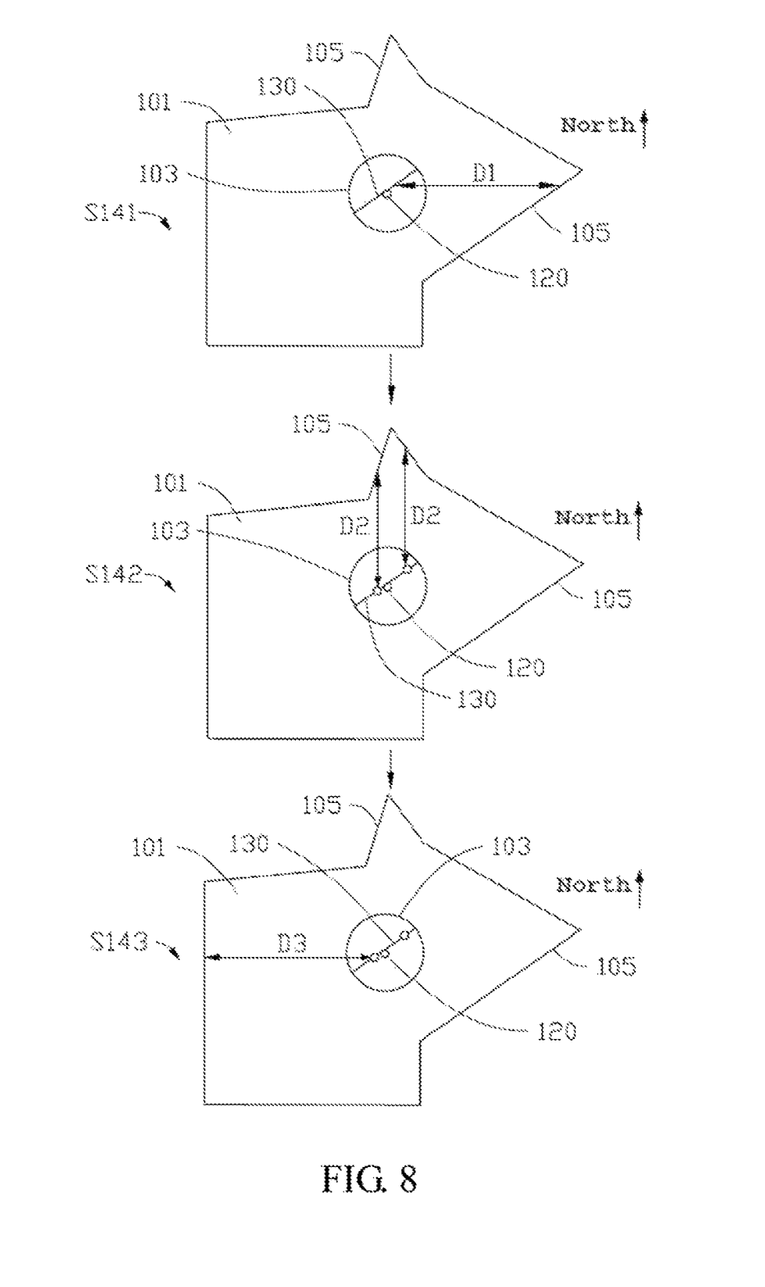
FIG. 8 is a schematic view of a process of determining an actual position of an object in a target area of an indoor positioning method of example 6.

Referring to FIG. 8, an indoor positioning method of example 6 performed by the indoor positioning system 10 is illustrated. The method includes following steps:

step (S11), obtaining the estimated position 120 of the object 12 on the indoor map 101;

step (S12), selecting a target area 103 on the indoor map 101, wherein the estimated position 120 is inside the target area 103;

step (S13), detecting the actual distance data D between the object 12 and the wall 105 surrounding the object 12, wherein the actual distance data D includes the 1st actual distance D1 along the 1st direction, the 2nd actual distance D2 along the 2nd direction . . . and the Mth actual distance DM along the Mth direction, M=4, an angle between adjacent two of the 1st direction, the 2nd direction . . . and the Mth direction is α, and α=360°/M;

step (S14), judging whether an unique point inside the target area 103 matches the actual distance data D by following substeps:

step (S141), the wall 105 of the indoor map 101 that is at the 1st direction of the target area 103 is parallel moved a distance D1 along the inverse direction of the 1st direction to obtain a 1st moved line, and part of the 1st moved line that is inside the target area 103 is defined as a 1st line 130;

step (S142), calculating the 2nd map distance d2 along the 2nd direction between each point on the 1st line 130 and the wall 105 of the indoor map 101;

step (S143), judging whether an unique point on the 1st line 130 satisfies d2=D2; if yes, the unique point on the 1st line 130 is used as the actual position 122 of the object 12, if no, set N=2 and go to step (S144)

step (S144), increasing value of N by N=N+1, calculating the Nth map distance dN along the Nth direction between each point that satisfies d(N−1)=D(N−1) and the wall 105 of the indoor map 101; judging whether the unique point satisfies dN=DN; if yes, the unique point is used as the actual position 122 of the object 12, if no, go to step (S145); and step (S145), judging N<M or N=M, if N<M, go back to step (S144), if N=M, go to step (S15); and step (S15), increasing value of M, and go back to step (S13).

The method of example 6 is similar to the method of example 5, except that in step (S141), the 1st line 130 inside the target area 103 is defined by moving the wall 105 of the indoor map 101. In example 6, two points that satisfies d2=D2 are obtained in step (S143). In step (S144), the unique point that satisfies dN=DN is the point that satisfies d3=D3 when N=3. The 1st direction is east, the 2nd direction is north, and the 3rd direction is west.

The indoor positioning method can be used inside of the building with a roof, such as shopping malls, office, warehouse, or workshop. The indoor positioning method can also be used in the place without roof, such as open-air football field, open-air plaza or open-air parking place, as long as the place is enclosed by a wall. The indoor positioning system can be utilized in both unmanned and manned moving platforms, such as drones, autonomous ground vehicles, robots cars, or motorcycles, etc.

The indoor positioning method of this disclosure not only overcome the flaw of high cost and significant amount of processing of the conventional indoor positioning system based on distance measurement or image processing, but also overcome the flaw of the conventional indoor positioning method based only on dead reckoning which has no means to correct the accumulated error over time.

The embodiments shown and described above are only examples. Even though numerous characteristics and advantages of the present technology have been set forth in the forego description, together with details of the structure and function of the present disclosure, the disclosure is illustrative only, and changes may be made in the detail, including in matters of shape, size and arrangement of the parts within the principles of the present disclosure up to, and including, the full extent established by the broad general meaning of the terms used in the claims.

Depending on the embodiment, certain of the steps of methods described may be removed, others may be added, and the sequence of steps may be altered. The description and the claims drawn to a method may include some indication in reference to certain steps. However, the indication used is only to be viewed for identification purposes and not as a suggestion as to an order for the steps.

What is claimed is:

1. An indoor positioning method performed by an indoor positioning system, the method comprises the following steps:

step (S10), installing the indoor positioning system on an object inside of a building, wherein the indoor positioning system comprises a gyroscope, a digital compass, an accelerometer, a distance sensor and a processor; an indoor map of the building is stored in the processor;

step (S11), obtaining an estimated position of the object on the indoor map;

step (S12), selecting a target area on the indoor map, wherein the estimated position is inside the target area;

step (S13), detecting an actual distance data D between the object and an actual wall of the building, wherein the actual distance data D comprises a 1st actual distance D1 along an 1st direction, a 2nd actual distance D2 along a 2nd direction, . . . and an Mth actual distance DM along an Mth direction, M□2, and M is a positive integer;

step (S14), judging whether there is a unique point inside the target area matches the actual distance data D; when there is a unique point inside the target area matches the actual distance data D, the unique point is used as an actual position of the object, when there is not a unique point inside the target area match the actual distance data D, go to step (S15); and step (S15), increasing value of M, and go back to step (S13).

2. The method of claim 1, wherein in step (S11), the obtaining the estimated position of the object comprises dead reckoning.

3. The method of claim 1, wherein in step (S12), a shape of the target area is circular, triangle, rectangle, square or polygon, and the estimated position is a geometrical cente of the target area.

4. The method of claim 1, wherein in step (S12), a speed error of the gyroscope, the digital compass and the accelerometer is v, a direction deviation of the gyroscope, the digital compass and the accelerometer is α, and the object moves from a starting position to the estimated position along a moving direction within a time t; two half-lines with the starting position as starting point are defined, and an angle between each of the two half-lines and the moving direction is α; a circular having the estimated position as a geometrical center is defined, and a semi-diameter r of the circular satisfies formula: r=vt; and a common area of the two half-lines and the circular is defined as the target area.

5. The method of claim 1, wherein in step (S13), when M=2, the 1st direction and the 2nd direction are perpendicular with each other, and at least one of the 1st direction and the 2nd direction is perpendicular with the actual wall of the building.

6. The method of claim 1, wherein in step (S13), when M=4, in a rectangular coordinates system, the 1st direction is +X direction, the 2nd direction is +Y direction, the 3rd direction is −X direction, and the 4th direction is −Y direction.

7. The method of claim 1, wherein in step (S13), when M=4, the 1st direction is east, the 2nd direction is north, the 3rd direction is west, and the 4th direction is south; when 8≥M>4, the 5th direction is northeast, the 6th direction is northwest, the 7th direction is southwest, and the 8th direction is southeast.

8. The method of claim 1, wherein in step (S14), the judging whether there is a unique point inside the target area matches the actual distance data D comprises:
  step (S141), calculating a map distance data d between a plurality points inside the target area and a map wall of the indoor map, wherein and the map distance data d comprises a 1st map distance d1 along the 1st direction, a 2nd map distance d2 along the 2nd direction . . . and a Nth map distance dN along a Nth direction, M≥N≥2, and N is a positive integer;
  step (S142), judging whether there is a unique point inside the target area has the map distance data d which matches the actual distance data D by comparing the map distance data d with corresponding one of the actual distance data D; when there is a unique point inside the target area has the map distance data d which matches the actual distance data D, the unique point is used as the actual position of the object, when there is not a unique point inside the target area has the map distance data d which matches the actual distance data D, go to step (S143);
  step (S143), increasing value of N by N=N+1, calculating the Nth map distance dN along the Nth direction, and judging whether there is a unique point inside the target area has the map distance data d which matches the actual distance data D; when there is a unique point inside the target area has the map distance data d which matches the actual distance data D, the unique point is used as the actual position of the object, when there is not a unique point inside the target area has the map distance data d which matches the actual distance data D, go to step (S144); and
  step (S144), judging N<M or N=M, when N<M, go back to step (S143), when N=M, go to step (S15).

9. The method of claim 8, wherein in step (S141), an interval H between adjacent two of the plurality points is the same as an accuracy S of the distance sensor.

10. The method of claim 9, wherein in step (S142) and step (S143), the judging whether there is a unique point inside the target area has the map distance data d which matches the actual distance data D comprises judging whether a condition: |D−d|≤S is satisfied, when the condition |D−d|≤S is satisfied, a judgement is that there is a unique point inside the target area has the map distance data d which matches the actual distance data D, when the condition |D−d|≤S is not satisfied, a judgement is that there is not a unique point inside the target area has the map distance data d which matches the actual distance data D.

11. The method of claim 1, wherein in step (S14), the judging whether there is a unique point inside the target area matches the actual distance data D comprises:
  step (S141), calculating a 1st map distance d1 along the 1st direction between each point inside the target area and a map wall of the indoor map, and obtaining a 1st line by connecting all points that satisfies a first condition d1=D1;
  step (S142), calculating a 2nd map distance d2 along the 2nd direction between each point inside the target area and the map wall of the indoor map, and obtaining a 2nd line by connecting all points that satisfies a second condition d2=D2;
  step (S143), judging whether the 1st line and the 2nd line have a unique common point; when the 1st line and the 2nd line have a unique common point, the unique common point is used as the actual position of the object, when the 1st line and the 2nd line do not have a unique common point, set N=2 and go to step (S144);
  step (S144), increasing value of N by N=N+1, calculating an Nth map distance dN along an Nth direction between each point inside the target area and the map wall of the indoor map, and obtaining a Nth line by connecting all the points that satisfies an Nth condition dN=DN; judging whether all the 1st line, the 2nd line . . . and the Nth line have a unique common point; when all the 1st line, the 2nd line . . . and the Nth line have a unique common point, the unique point is used as the actual position of the object, when all the 1st line, the 2nd line . . . and the Nth line do not have a unique common point, go to step (S145); and
  step (S145), judging N<M or N=M, when N<M, go back to step (S144), when N=M, go to step (S15).

12. The method of claim 1, wherein in step (S14), the judging whether there is a unique point inside the target area matches the actual distance data D comprises:
  step (S141), a 1st map wall of the indoor map that is at the 1st direction of the target area is parallel moved distance D1 along an inverse direction of the 1st direction to obtain a 1st moved line, and part of the 1st moved line that is inside the target area is defined as a 1st line;
  step (S142), a 2nd map wall of the indoor map that is at the 2nd direction of the target area is parallel moved distance D2 along an inverse direction of the 2nd direction to obtain a 2nd moved line, and part of the 2nd moved line that is inside the target area is defined as a 2nd line;
  step (S143), judging whether the 1st line and the 2nd line have a unique common point; when the 1st line and the 2nd line have a unique common point, the unique common point is used as the actual position of the object, when the 1st line and the 2nd line do not have a unique common point, set N=2 and go to step (S144);
  step (S144), increasing value of N by N=N+1, an Nth map wall of the indoor map that is at an Nth direction of the target area is parallel moved distance DN along an inverse direction of the Nth direction to obtain a Nth moved line, and part of the Nth moved line that is inside the target area is defined as a Nth line; judging whether all the 1st line, the 2nd line . . . and the Nth line have a unique common point; when all the 1st line, the 2nd line . . . and the Nth line have a unique common point, the unique point is used as the actual position of the object, when all the 1st line, the 2nd line . . . and the Nth line do not have a unique common point, go to step (S145); and
  step (S145), judging N<M or N=M, when N<M, go back to step (S144), when N=M, go to step (S15).

13. The method of claim 1, wherein in step (S14), the judging whether there is a unique point inside the target area matches the actual distance data D comprises:

step (S141), calculating a 1st map distance d1 along the 1st direction between each point inside the target area and a map wall of the indoor map, and obtaining a 1st line by connecting all points that satisfies a 1st condition d1=D1;

step (S142), calculating a 2nd map distance d2 along the 2nd direction between each point on the 1st line and the map wall of the indoor map;

step (S143), judging whether there is a unique point on the 1st line satisfies d2=D2; when there is a unique point on the 1st line satisfies d2=D2, the unique point on the 1st line is used as the actual position of the object, when there is not a unique point on the 1st line satisfies d2=D2, set N=2 and go to step (S144);

step (S144), increasing value of N by N=N+1, calculating an Nth map distance dN along an Nth direction between each point that satisfies d(N−1)=D(N−1) and the map wall of the indoor map; judging whether there is a unique point satisfies dN=DN; when there is a unique point satisfies dN=DN, the unique point is used as the actual position of the object, when there is not a unique point satisfies dN=DN, go to step (S145); and step (S145), judging N<M or N=M, when N<M, go back to step (S144), when N=M, go to step (S15).

14. The method of claim 1, wherein in step (S14), the judging whether there is a unique point inside the target area matches the actual distance data D comprises:

step (S141), a 1st map wall of the indoor map that is at the 1st direction of the target area is parallel moved distance D1 along an inverse direction of the 1st direction to obtain a 1st moved line, and part of the 1st moved line that is inside the target area is defined as a 1st line;

step (S142), calculating a 2nd map distance d2 along the 2nd direction between each point on the 1st line and the map wall of the indoor map;

step (S143), judging whether there is a unique point on the 1st line satisfies d2=D2; when there is a unique point on the 1st line satisfies d2=D2, the unique point on the 1st line is used as the actual position of the object, when there is not a unique point on the 1st line satisfies d2=D2, set N=2 and go to step (S144);

step (S144), increasing value of N by N=N+1, calculating an Nth map distance dN along an Nth direction between each point that satisfies d(N−1)=D(N−1) and the map wall of the indoor map; judging whether there is a unique point satisfies dN=DN; when there is a unique point satisfies dN=DN, the unique point is used as the actual position of the object, when there is not a unique point satisfies dN=DN, go to step (S145); and step (S145), judging N<M or N=M, when N<M, go back to step (S144), when N=M, go to step (S15).

15. The method of claim 1, wherein in step (S15), the increasing value of M is performed by M=M+A, and A is a natural number.

16. The method of claim 1, wherein in step (S15), the increasing value of M is performed by M=B×M, and B is a natural number greater than one.

17. An indoor positioning method performed by an indoor positioning system, the method comprises the following steps:

step (S10), installing the indoor positioning system on an object inside of a building, wherein the indoor positioning system comprises a gyroscope, a digital compass, an accelerometer, a distance sensor and a processor; an indoor map of the building is stored in the processor;

step (S11), obtaining an estimated position of the object on the indoor map;

step (S12), selecting a target area on the indoor map, wherein the estimated position is inside the target area;

step (S13), detecting an actual distance data D between the object and an actual wall of the building, wherein the actual distance data D comprises a 1st actual distance D1 along a 1st direction, a 2nd actual distance D2 along a 2nd direction, a 3rd actual distance D3 along a 3rd direction . . . and an Mth actual distance DM along an Mth direction, M=4, an angle between adjacent two of the 1st direction, the 2nd direction, the 3rd direction . . . and the Mth direction is α, and α=360°/M;

step (S14), judging whether there is a unique point inside the target area matches the actual distance data D; when there is a unique point inside the target area matches the actual distance data D, the unique point is used as an actual position of the object, when there is not a unique point inside the target area matches the actual distance data D, go to step (S15); and step (S15), increasing value of M, and go back to step (S13).

18. An indoor positioning system configured to position an object inside a building, comprising: a gyroscope, a digital compass, an accelerometer, a distance sensor and a processor; wherein an indoor map of the building is stored in the processor; the gyroscope, the digital compass and the accelerometer are configured to obtain an estimated position of the object on the indoor map; the distance sensor is configured to detect an actual distance data D between the object and an actual wall of the building; and the processor comprises a correction module configured to correct the estimated position according to the actual distance data D; wherein an indoor positioning method of the indoor positioning system comprises the following steps:

step (S11), obtaining an estimated position of the object on the indoor map;

step (S12), selecting a target area on the indoor map, wherein the estimated position is inside the target area;

step (S13), detecting an actual distance data D between the object and an actual wall of the building, wherein the actual distance data D comprises a 1st actual distance D1 along an 1st direction, a 2nd actual distance D2 along a 2nd direction, . . . and an Mth actual distance DM along an Mth direction, M☐2, and M is a positive integer;

step (S14), judging whether there is a unique point inside the target area matches the actual distance data D; when there is a unique point inside the target area matches the actual distance data D, the unique point is used as an actual position of the object, when there is not a unique point inside the target area match the actual distance data D, go to step (S15); and step (S15), increasing value of M, and go back to step (S13).

19. The indoor positioning system of claim 18, wherein the indoor positioning system consist of the gyroscope, the digital compass, the accelerometer, the distance sensor and the processor.

* * * * *